GRINDING MACHINE AND METHOD UTILIZING ABRASIVE DISCS

Original Filed March 30, 1955 2 Sheets-Sheet 1

Inventor
Sidney M. Napp by Parker & Carter
Attorneys

GRINDING MACHINE AND METHOD UTILIZING ABRASIVE DISCS

Original Filed March 30, 1955 2 Sheets-Sheet 2

Inventor
Sidney M. Napp by Parker & Carter
Attorneys

United States Patent Office

Re. 24,777

Reissued Feb. 9, 1960

24,777

GRINDING MACHINE AND METHOD UTILIZING ABRASIVE DISCS

Sidney M. Napp, Rockton, Ill., assignor to Besley-Welles Corporation, Chicago, Ill., a corporation of Illinois Original No. 2,805,525, dated September 10, 1957, Serial No. 497,966, March 30, 1955. Application for reissue May 19, 1959, Serial No. 814,364

6 Claims. (Cl. 51—118)

Matter enclosed in heavy brackets [ ] appears in the original patent but forms no part of this reissue specification; matter printed in italics indicates the additions made by reissue.

This invention is directed to a new and improved form of grinding machine utilizing abrasive discs.

One purpose of the present invention is to provide an improved arrangement of an abrasive disc and feed wheel, so as to provide higher efficiencies in terms of cost. In particular, the present invention increases the grinding path of the workpiece as it moves across the face of the abrasive disc. Less dressing of abrasives is required in machines embodying the present invention, and smaller grinding discs may be employed.

Another purpose of the present invention is the provision of an improved support for a feed wheel in a grinding machine.

*Another object is a new and improved grinding method in which the work pieces are caused to traverse substantially the full working diameter of the grinding disc so that this abrasive material will be worn away evenly and the disc will require far less dressing.*

Other purposes will appear from time to time in the course of the ensuing specification and claims.

Referring generally now to the drawings.

Like elements are designated by like characters throughout the specification and drawings.

Figure 1:
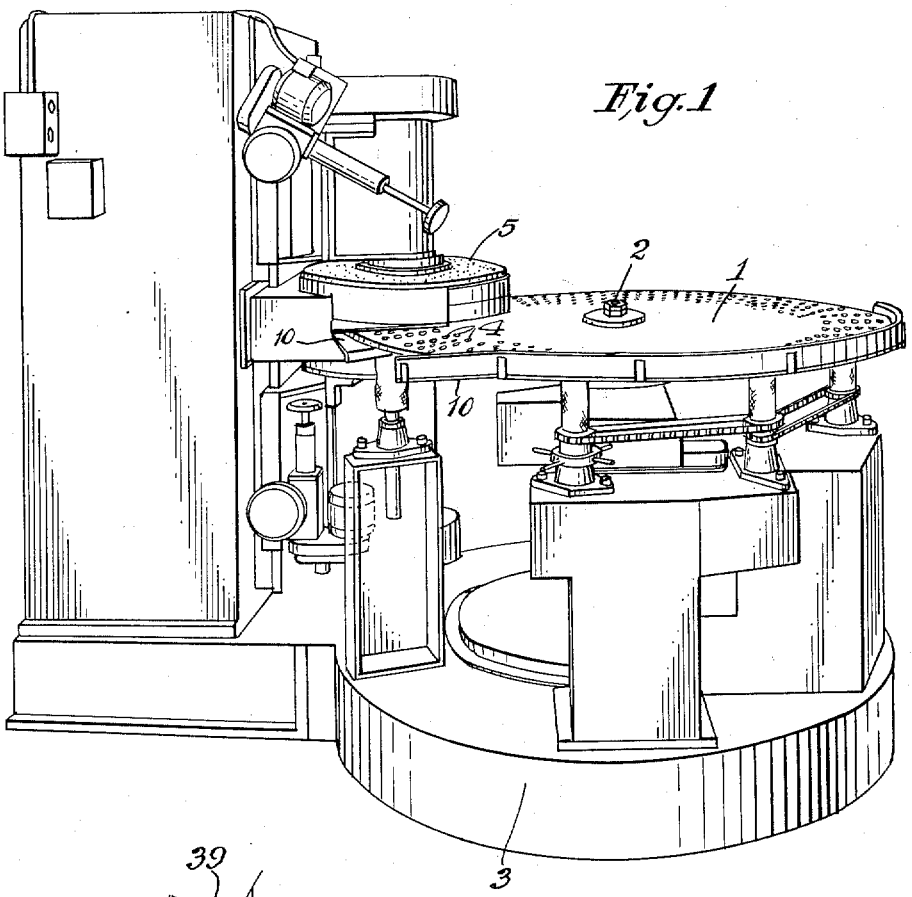
Figure 1 is a perspective view of a grinding machine that may advantageously employ the principles of the present invention.

With specific reference now to the drawings and, in the first instance, to Figure 1, I have illustrated a double disc grinding machine. As will be seen in Figure 1, the machine includes a feed wheel 1 which is mounted for rotation on a shaft 2, extending vertically. Shaft 2 is supported on a base 3. Feed wheel 1 includes apertures 4 which are adapted to carry workpieces into and out of contact with the opposed faces of a pair of grinding discs 5 and 6. The apertures 4 are arranged in peripheral rows extending about the shaft 2.

During the work-performing operation, workpieces such as coil springs 7 (Figure 2), are inserted into the apertures 4, and as the feed wheel rotates about the axis of the shaft 2, the opposite ends of the workpieces are moved across the working faces 8 and 9 of the discs 5 and 6. In this form of machine, a loading plate 10 is generally parallel to the working face 9 of the lower disc 6, so as to guide the workpieces onto the discs.

The base 3 of the machine may include suitable motor means for rotating discs 5 and 6 about the axes of their supporting shafts 11 and 12, respectively. Similarly suitable motor means may be provided for rotating the feed wheel 1, so as to move the work carried thereby into and out of grinding contact with the faces 8 and 9 of the discs.

Figure 4:
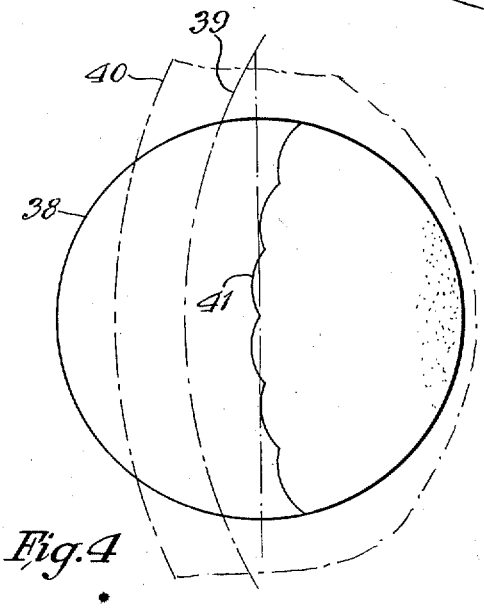
Figure 4 is a schematic illustration of the work path as developed by the invention.

As will be seen in Figures 1 and 4, the feed wheel 1 is of much larger diameter than that of the grinding discs 5 and 6, and said grinding discs are offset from the axis of the feed wheel so that all of the grinding is limited to an area adjacent the periphery of the feed wheel as the latter moves generally diametrically across and between the grinding discs.

The elements of the machine thus far described should be taken as typical of grinding disc and feed wheel assembly with which the present invention is employed. The present invention may be employed with other basic forms of grinding machines. The invention may, for example, be employed with a machine having a feed wheel similar to that shown at 1, mounted for rotation about a horizontal axis with the abrasive discs also mounted abouft horizontal axes. The form of machine illustrated in Figure 1 should be taken as illustrative and not as limiting me to a specific grinding machine.

Figure 3:
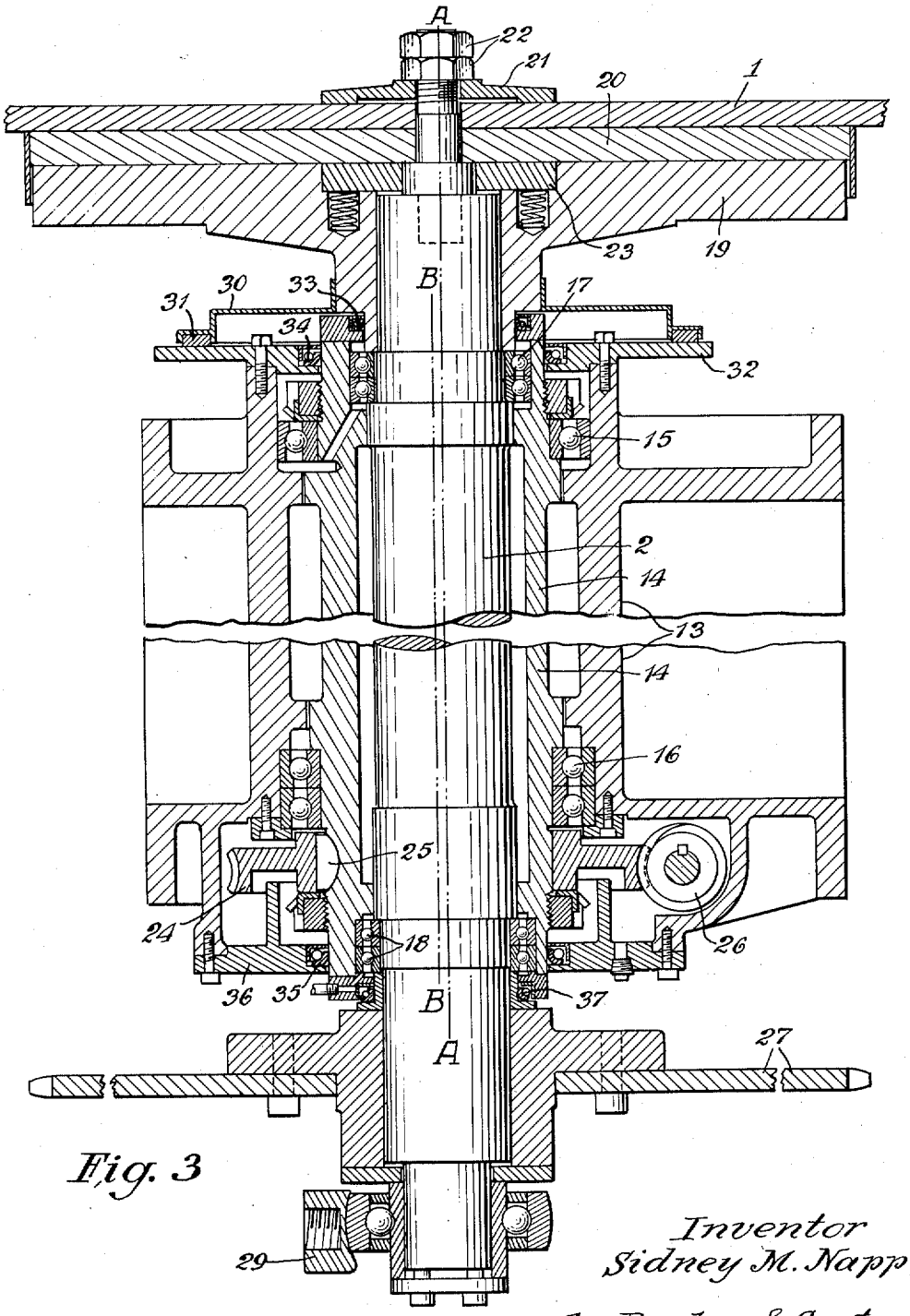
Figure 3 is a detail view in section of the feed wheel support utilized in the machine shown in Figure 1.

According to the invention, I provide a mounting for the feed wheel 1 which moves each of the workpieces carried along the periphery of the feed wheel 1 through a scalloped path as the workpiece is moved generally diametrically across the face of the grinding disc. Figure 3 illustrates a form of mounting which has proven advantageous to this particular result. In this figure, a portion of the base 3 is represented at 13. The portion 13 serves to rotatably support a sleeve 14. Suitable upper and lower bearings 15 and 16 may be provided between the sleeve 14 and the portion 13. The feed wheel supporting shaft 2 is mounted for rotation in the sleeve 14, as by upper and lower bearing assemblies 17 and 18, respectively. The axis of the shaft 2 is designated A—A, while the axis of the sleeve is designated B—B. It will be noted that the axis of the sleeve extends generally parallel but is offset from the axis of the shaft 2.

The upper end of the shaft 2 has a hub 19 fixed thereto through suitable means. A backing plate 20 is positioned between the hub 19 and feed wheel 1. Suitable means, such as the clamping plate 21 and bolt and nut assembly 22, may be provided to clamp the feed wheel 1 to the backing plate 20 and hub 19. A spring-loaded pressure plate 23 may be mounted between the hub 19 and backing plate 20.

A worm wheel 24 is fixed to the sleeve 14 as by the key 25 and is driven by a worm 26. The worm 26 is rotated by any suitable motor carried by the base 3.

The lower end of the shaft 2 has a sprocket 27 fixed thereto. Sprocket 27 is rotated by a chain. Suitable compensating means may be provided in the chain drive to insure proper tension on the chain. The chain, for example, may be engaged with the sprocket 27 and engaged with a driving sprocket (not shown), which is in turn driven by the speed-reducing assembly mounted on a pivotal bracket. A turnbuckle may extend between the bracket and an attachment 29 encircling the lower end of the shaft 2. Thus, during the eccentric motion of the shaft 2, proper tension will be maintained on the chain.

A dust shield 30 is fixed to the hub 19 and includes a circumferential seal 31 engageable with the plate 32 carried by the portion 13. During eccentric motion and rotation of the shaft 2, the seal 31 moves across the plate 32 and excludes dust and foreign matter from the bearing assemblies. Other seals, such as those designated at 33 and 34, may be provided between the sleeve 14 and plate 32 and sleeve 14 and shaft 2.

A circumferential seal 35 may be carried by a plate 36 which is fixed to the lower end of the portion 13 and excludes dust and foreign matter from reaching the bearings 16. Another seal 37 may be provided between the shaft 2 and sleeve 14, so as to prevent the ingress of dust and other forms of foreign matter to the assembly 18.

As the feed wheel shaft 2 is rotated by the sprocket 27 and chain drive, the eccentric sleeve 14 is rotated by the worm 26. The sleeve 14 is rotated at a much higher speed than that of the feed wheel, so as to cause the path of a workpiece carried adjacent the periphery of the wheel 1 to take a scalloped form as it crosses or traverses the face of the grinding disc. I have illustrated this principle schematically in Figure 4. In this figure, 38 represents the face of the grinding disc. The arcuate lines 39 and 40 are developed about the center of shaft 2 as an axis and represent the arcuate movement of points adjacent the periphery of the feed wheel as they cross the face of the disc. With the eccentric motion of the sleeve 14 superimposed on the motion developed by the rotation of the shaft 2 about its axis, the path of a workpiece takes a scalloped form, as indicated at 41 when the workpiece crosses the face of the abrasive disc.

In Figure 4 the path 41 includes six individual arcs in the course of its traversing movement. The traversing movement may occur during approximately one-eighth of a revolution of the feed wheel, although this will vary in accordance with the relative sizes of the abrasive disc and the feed wheel. Whereas I have shown six individual arcs in the traversing path, I wish it to be understood that this number may vary, depending upon the relative speed of the feed wheel shaft 2 and the speed of rotation of the sleeve 14, as well as the relative sizes of the feed wheel and grinding disc.

Figure 2:
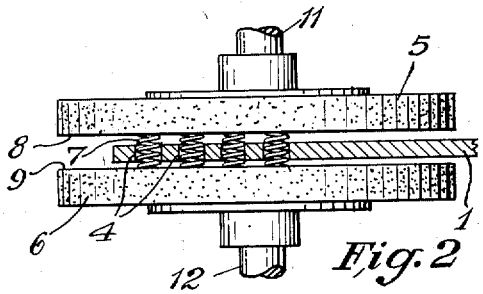
Figure 2 is a detail view, in section, of a pair of grinding discs and a feed wheel, such as are employed with the machine shown in Figure 1

Manifestly the apertures 4 in which the workpieces are carried adjacent the periphery of the feed wheel are all so disposed that they all traverse the grinding disc at or near the center of the latter, as indicated in Figures 2 and 4, so as to produce substantially equal grinding action on all of the workpieces.

It has been found advantageous, when using the principles of the invention, to use a variable speed drive for the feed wheel shaft, and a variable speed drive for the sleeve 14. In a typical example, the feed wheel may be driven at a maximum speed of one revolution in four minutes, and a minimum speed of one revolution in 32 minutes, while the sleeve is driven at a speed in the range of 3 to 10 revolutions per minute.

The effect desired is that of the scalloped path traced by the workpiece with relation to the face of the grinding disc as the workpiece is moved into and out of grinding contact with the abrasive disc. Furthermore, by causing the scalloped path of the workpieces to cross the face of the grinding disc substantially diametrically of the latter, the workpiece is engaged by the grinding disc and rotating in one direction during the first half of its traverse across the disc, and rotating in the opposite direction during the second half of its traverse, as will be seen from Figure 4 of the drawings.

Due to the scalloped path followed by the workpieces in the peripheral recesses of the feed wheel, they are presented to, or worked upon, by the abrasive material between grinding discs at constantly varying angles, so that the grains of abrasive are maintained at maximum working efficiency instead of being continuously engaged and worn away solely in generally circumferential paths, as is the case with conventional grinding machines. Moreover, the workpieces are caused to traverse substantially the full working diameter of the grinding disc so that the abrasive material of the latter is worn away evenly over the entire working surface of the disc. Because of these novel features, the grinding disc requires far less dressing than is the case with conventional grinding machines.

In addition, the workpieces do not tend to develop burred edges which must be removed by a separate operation, as is usually the case with conventional grinding machines.

The principles of the invention illustrated herein may be applied to grinding machines having feed wheels rotatable about their vertical or horizontal axes. The invention may also be applied to machines having a single abrasive disc and to machines having a plurality of pairs of abrasive discs. There are other modifications to the invention which will fall within the scope and spirit of the invention and which will be apparent to those skilled in the art. The scope of the invention should be limited only by the scope of the hereinafter appended claims.

I claim:

1. In a grinding machine, a pair of axially spaced coaxially arranged grinding disc members, bearing means rotatably mounting said disc members for rotation about a first axis, a feed wheel member disposed intermediate the disc members, said feed wheel member having a diameter greater than the diameters of the disc members, a second bearing means rotatably mounting said feed wheel member for rotation about a second axis spaced from and disposed in substantially parallel relation to said first axis, said feed wheel member having a plurality of workpiece holders adjacent the periphery thereof for conveying workpieces across the faces of and between the grinding disc members with the periphery of the feed wheel member traversing the disc members substantially diametrically thereof, mounting means for said feed wheel member eccentrically positioned relative to the axis of said feed wheel member for oscillating the bearing means of said feed wheel member in an orbital path about a third axis disposed substantially parallel to the rotational axes of said feed wheel member and disc members, said third axis being radially offset outwardly beyond the periphery of said grinding disc members, power means for rotating the grinding disc members and the feed wheel member about the respective first and second axes and for rotating said mounting means in said orbital path about said third axis including means controlling the speed of the oscillation of said mounting means relative to the speed of rotation of the grinding disc members and the speed of rotation of the said feed wheel member to cause the workpiece holders on the feed wheel member to have movement relative to the faces of the grinding disc members in a cycloidal path such that the motion of a workpiece describes a plurality of scallops across a segment of the respective disc members with the workpiece holders, in following the cycloidal path, passing into the space between the disc members and then outwardly beyond the periphery of the disc members to permit loading and unloading thereof while the machine is in operation.

2. The device according to claim 1, wherein the mounting means is a sleeve and wherein the second bearing means is eccentrically mounted in said sleeve, and includes a dust seal enclosing said second bearing means and said mounting means.

3. The device according to claim 1, wherein said third axis is disposed radially within the periphery of the said feed wheel member.

*4. A method of grinding workpieces on a grinding wheel having a circular grinding face with a predetermined radius and constructed to be rotated about the axis of the wheel, including the steps of rotating the grinding wheel about its axis at a predetermined speed, feeding workpieces through an arcuate path on a radius several times larger than the radius of the grinding face, positioning the arcuate path in a plane generally parallel to the plane of and across the grinding face with the extreme point of the arcuate path adjacent the center of the grinding face and the incoming and outgoing legs of the path generally perpendicular to the edges of the grinding face at the points of intersection thereof, oscillating the workpieces during movement through the arcuate path generally perpendicular thereto across the grinding face with a predetermined frequency and amplitude, and feeding the workpieces through the arcuate path at a peripheral speed relative to the frequency of oscillation such that a plurality of uniform scallops will occur in the otherwise arcuate path across the grinding face.*

*5. A method of grinding workpieces on a grinding wheel having a circular grinding face with a predetermined radius and constructed to be rotated about its axis, including the step of rotating the grinding wheel about its axis at a uniform rate of speed, feeding workpieces through a generally arcuate path on a radius several times larger than the radius of the grinding face, positioning the arcuate path of the work pieces in a plane generally parallel to the plane of and across the grinding face with the extreme point of the arcuate path generally adjacent the center of the grinding face, creating relative oscillatory movement between the workpieces and the grinding face in the plane parallel to the plane of the grinding face during movement of the workpieces through the arcuate path, such oscillatory movement being generally perpendicular to the arcuate path and at a predetermined frequency, and feeding the workpieces through the arcuate path at a speed relative to the frequency of oscillation such that the workpieces will describe a plurality of scallops during their movement in the arcuate path across the grinding face.*

*6. The method of claim 5 further characterized by and including the steps of positioning two grinding wheels generally opposite each other and in spaced relation with their axes coextensive, rotating both wheels in the same direction and at the same speed, and feeding the workpieces through the arcuate path between the wheels so that the workpieces will be simultaneously engaged at each end by the grinding wheels, and creating the oscillatory motion by oscillating the workpieces relative to the grinding face.*

References Cited in the file of this patent or the original patent

UNITED STATES PATENTS

| | | |
|---|---|---|
| 1,371,854 | Buck | Mar. 15, 1921 |
| 1,610,984 | Van Keuren | Dec. 14, 1926 |
| 1,870,323 | Indge | Aug. 9, 1932 |
| 1,978,674 | Johnson | Oct. 30, 1934 |
| 1,992,452 | Troendly | Feb. 26, 1935 |
| 2,238,859 | Indge | Apr. 15, 1941 |
| 2,580,542 | Heath | Jan. 1, 1952 |